United States Patent
Gottlieb

4,043,641
Aug. 23, 1977

[54] THREE-LENS SYSTEM PROVIDING A VARIABLE FOCAL POWER ALONG ONE PRINCIPAL MERIDIAN

[75] Inventor: Nathan Gottlieb, Kenmore, N.Y.

[73] Assignee: American Optical Corporation, Southbridge, Mass.

[21] Appl. No.: 705,852

[22] Filed: July 16, 1976

[51] Int. Cl.² .............................. G02B 13/08
[52] U.S. Cl. ........................ 350/181; 350/190
[58] Field of Search ..................... 350/181, 190

[56] References Cited
U.S. PATENT DOCUMENTS

3,576,357  4/1971  Levy ........................... 350/181

FOREIGN PATENT DOCUMENTS

416,074  9/1934  United Kingdom ............. 350/181

*Primary Examiner*—Paul A. Sacher
*Attorney, Agent, or Firm*—Alan H. Spencer; William C. Nealon; H. R. Berkenstock, Jr.

[57] ABSTRACT

Variable focal power along one principal meridian may be obtained by an optical system having two cylinder lenses at either end and their axis of cylinder in a single plane spaced along an optical axis. A moveable cylinder lens with its axis oriented 90° to the plane is slideably mounted therebetween. A plano color correction plate substantially eliminates color aberrations which would otherwise be present in the system.

2 Claims, 1 Drawing Figure

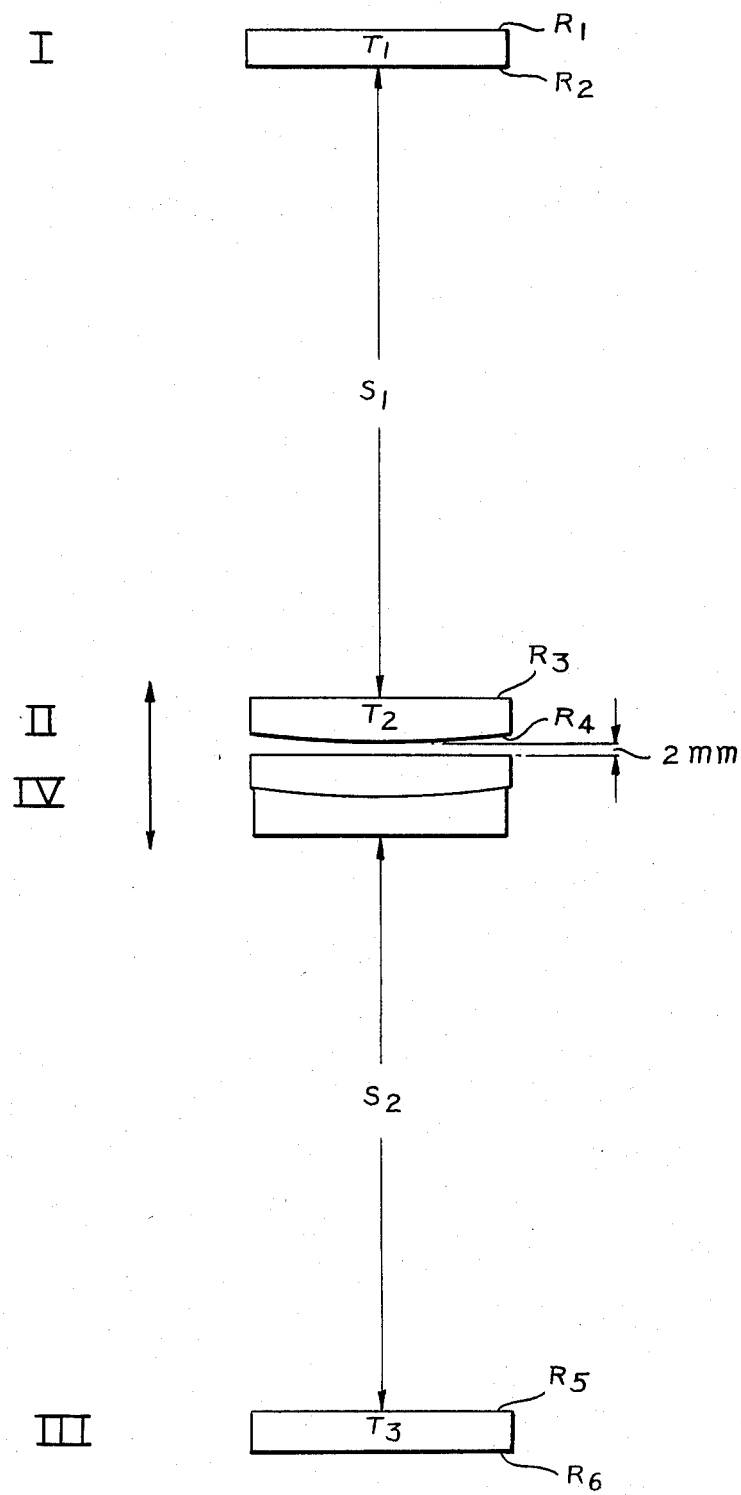

THREE-LENS SYSTEM PROVIDING A VARIABLE FOCAL POWER ALONG ONE PRINCIPAL MERIDIAN

BACKGROUND OF THE INVENTION

This invention relates to an optical system for varying focal power along one principal meridian. The system provides an effective focal range from 250mm to 416.6mm along one meridian and a fixed effective focal distance of 333mm along the other principal meridian. An optional color correction plate provides good color correction substantially eliminating chromatic aberration of the system.

THE DRAWING

The drawing is an optical diagram of the embodiment of this invention.

DESCRIPTION OF THE PREFERRED EMBODIMENT

Referring to the drawing, lens I is a plano-cylindrical singlet having its cylindrical axis on the plane of the drawing. Lens II is a plano-cylindrical singlet axially slidable along the optical axis and having its axis of cylinder perpendicular to the drawing and lens III is a plano-cylindrical singlet having its axis of cylinder in the same plane as lens I. Color correction plate IV is an optional component comprising a plano-concave singlet cemented to a convex-plano singlet. If used, the color correction plate is positioned adjacent to lens II on the side of lens III.

The parameters of the optical system set forth in Table I with axial thicknesses of successive lens components are designated $T_1$ to $T_3$ and successive axial spaces are designated $S_1$ to $S_2$. Successive lens radii are designated $R_1$ to $R_6$ and having a curvature which lies on the side opposite the focal-plane side of the lens. Refractive indices and Abbe numbers of the glasses in the successive lenses are absolute values designated $ND_1$ to $ND_3$ and $\nu_1$ to $\nu_3$. The values in the following Table may vary by plus or minus three percent without deviation from the concept of this invention.

Table I

| Lens | Cyl. Radius | Thickness (T) | Spacing (S) | Index of Refraction (ND) | Abbe No. ($\nu$) |
|---|---|---|---|---|---|
| I | $R_1 = \infty$ | $T_1 = 5.0$-mm | | $ND_1 = 1.523$ | $\nu_1 = 58$ |
| | $R_2 = 261.5$mm | | $S_1 = 28.3$ to $139.4$mm | | |
| II | $R_3 = \infty$ | $T_2 = 5.0$-mm | | $ND_2 = 1.523$ | $\nu_2 = 58$ |
| | $R_4 = 174.33$mm | | $S_2 = 160.4 \cdot S_1$ | | |
| | $R_5 = \infty$ | | | | |
| III | | $T_3 = 5.0$-mm | | $ND_3 = 1.523$ | $\nu_3 = 58$ |
| | $R_6 = 348.67$mm | | | | |

Optional color plate IV is preferably spaced 2mm from cylinder lens II toward cylinder lens III. The plano-concave component of lens IV has a radius of 103mm, a thickness of 5mm, an index of refraction of 1.617 and an Abbe number of 36.6. The convex-plano component of lens IV also has a radius of 103mm, a thickness of 5mm with an index of refraction of 1.617 and an Abbe number of 55.1. When used in conjunction with the foregoing optical system and spaced 2.0mm from cylinder lens II, the optional color plate IV provides a system substantially free of chromatic aberration.

What is claimed is:

1. An optical system for varying focal power along one principal meridian comprising, in alignment along an optical axis, two-spaced cylinder lenses I and II having their axis of cylinder in a plane passing through the optical axis and an axially-slidable cylindrical lens III having an axis of cylinder perpendicular to said plane, said lenses having values set forth in the following table wherein axial thicknesses of successive lenses are designated $T_1$ to $T_3$, successive axial spaces are designated $S_1$ to $S_2$, successive lens radii are designated $R_1$ to $R_6$ wherein the radius denotes cylinder curvature about a line lying on the side opposite the focal-plane side of the lenses, refractive indices and Abbe numbers of the glasses in the successive lenses are absolute values designated $ND_1$ to $ND_3$ and $\nu_1$ to $\nu_3$,

| Lens | Cyl. Radius | Thickness (T) | Spacing (S) | Index of Refraction (ND) | Abbe No. ($\nu$) |
|---|---|---|---|---|---|
| I | $R_1 = \infty$ | $T_1 = 5.0$-mm | | $ND_1 = 1.523$ | $\nu_1 = 58$ |
| | $R_2 = 261.5$mm | | $S_1 = 28.3$ to $139.4$mm | | |
| II | $R_3 = \infty$ | $T_2 = 5.0$-mm | | $ND_2 = 1.523$ | $\nu_2 = 58$ |
| | $R_4 = 174.33$mm | | $S_2 = 160.4 S_1$ | | |
| | $R_5 = \infty$ | | | | |
| III | | $T_3 = 5.0$-mm | | $ND_3 = 1.523$ | $\nu_3 = 58$ |
| | $R_6 = 348.67$mm | | | | |

2. The optical system according to claim 1 further including a plano color correction plate spaced 2mm from lens II toward lens I consisting of a plano-concave component cemented to a plano-convex component having a radius $R_5$ of 103mm, both having an index of refraction of 1.617, a thickness of 5mm and said plano-concave component has an Abbe number of 36.6 and said plano-convex component has an Abbe number of 55.1.

* * * * *